United States Patent [19]

Schurmann

[11] Patent Number: 5,355,137
[45] Date of Patent: Oct. 11, 1994

[54] METHOD OF READING THE DATA STORED IN A PASSIVE RESPONDER BY MEANS OF AN INTERROGATION DEVICE COMPRISING A RECEIVING SECTION

[75] Inventor: Josef H. Schurmann, Oberhummel, Fed. Rep. of Germany

[73] Assignee: Texas Instruments Incorporated, Dallas, Tex.

[21] Appl. No.: 958,618

[22] Filed: Oct. 9, 1992

[30] Foreign Application Priority Data

Oct. 17, 1991 [EP] European Pat. Off. ........ 91117724.4

[51] Int. Cl.[5] ............................................. G01S 13/80
[52] U.S. Cl. ...................................... 342/42; 342/44; 342/51
[58] Field of Search ................... 342/42, 44, 51, 45

[56] References Cited

U.S. PATENT DOCUMENTS

| | | | |
|---|---|---|---|
| 3,859,624 | 1/1975 | Kriofsky et al. | 342/44 X |
| 4,068,232 | 1/1978 | Meyers et al. | 342/44 |
| 4,104,629 | 8/1978 | Isbister et al. | 342/43 |
| 4,359,733 | 11/1982 | O'Neill | 342/36 |
| 5,164,985 | 11/1992 | Nysen et al. | 342/44 X |
| 5,258,762 | 11/1993 | Cabon et al. | 342/42 |

*Primary Examiner*—John B. Sotomayor
*Attorney, Agent, or Firm*—Rebecca Mapstone; James C. Kesterson; Richard L. Donaldson

[57] ABSTRACT

A method is described for reading the data stored in a passive responder (20) by means of an interrogation device (10) including a receiving section (14). To initiate a read cycle the interrogation device (10) transmits an HF interrogation pulse which on reception in the responder (20) is used to generate a supply voltage and initiates the transmission of an HF signal coded with the stored data. The frequency of the HF interrogation pulse is varied during its transmission over a predetermined range containing the nominal frequency of the responder (20). The receiving section (14) of the interrogation device (10) includes a tuning circuit (15) which adjusts the receiving frequency of the receiving section (14) to the frequency of the HF signal transmitted by the responder (20).

3 Claims, 1 Drawing Sheet

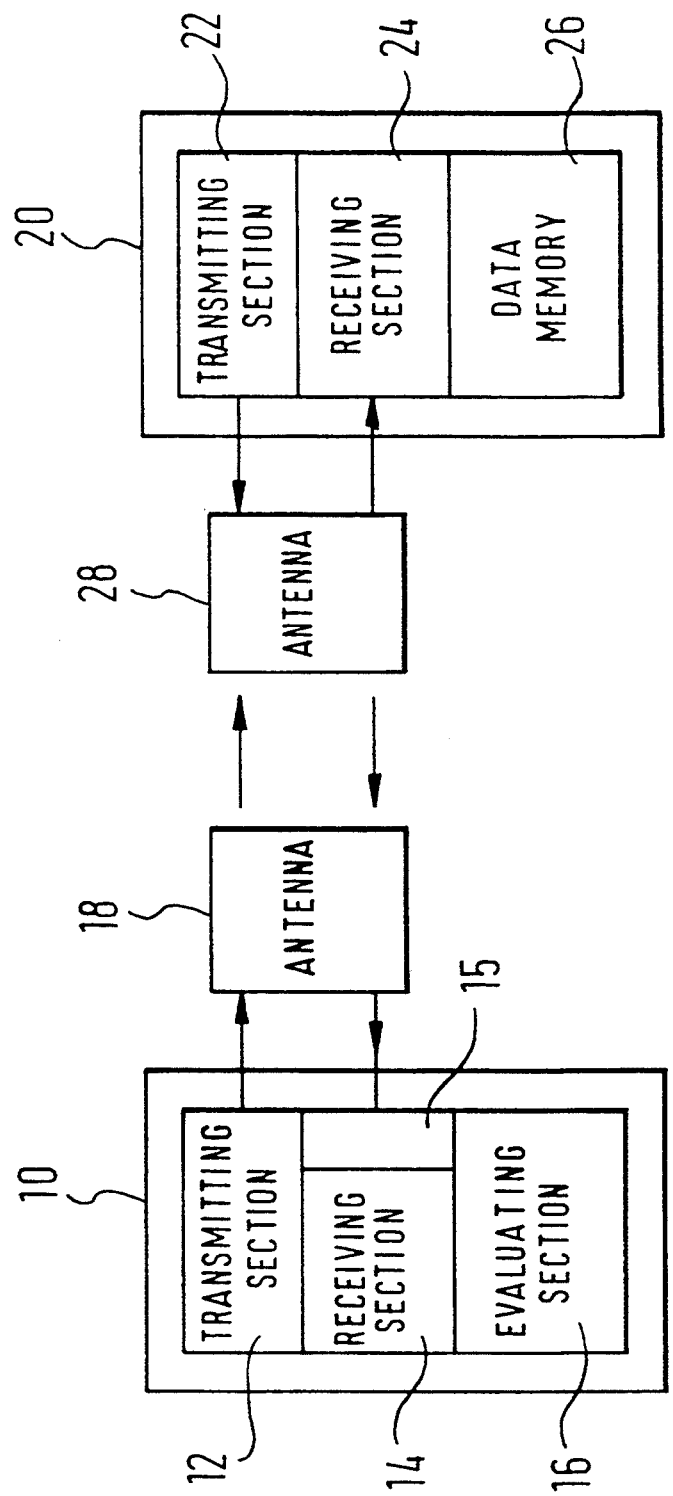

METHOD OF READING THE DATA STORED IN A PASSIVE RESPONDER BY MEANS OF AN INTERROGATION DEVICE COMPRISING A RECEIVING SECTION

FIELD OF THE INVENTION

The invention relates to a method of reading the data stored in a passive responder by means of an interrogation device which comprises a receiving section and which for initiating a read cycle transmits an HF interrogation pulse which when received in the responder is used to generate a supply voltage and initiates the transmission of an HF signal coded with the stored data.

BACKGROUND OF THE INVENTION

A method of this type is known from U.S. Pat. No. 5,053,774. When carrying out this method, as responder a transponder is used which does not contain its own energy supply source but which generates the energy necessary for its operation from the HF interrogation pulse transmitted by the interrogation device and received by said responder through an antenna. The antenna of the transponder used as responder device is part of a resonant circuit of which the resonant frequency is tuned exactly to the frequency of the interrogation pulse. Since the interrogation device transmits the HE interrogation pulse with an exactly defined frequency, the resonant circuit of the transponder must be tuned exactly to said frequency to enable enough HE energy to be received for generation of the supply voltage in the transponder. If the resonant circuit of the transponder is out of tune with the frequency of the HF interrogation pulse or is not correctly adjusted, only an inadequate transfer can take place from the interrogation device to the transponder and as a result the supply voltage generated in the transponder might possibly no longer suffice for carrying out the desired sending back of tile data stored therein.

The data stored in the transponder serving as responder device may consist for example of an identification number so that by said number for example an article to which the transponder is attached can be identified. It is also possible to implant the transponders into animals so that the latter can then be uniquely identified by the numbers during their entire life. However, there are uses in which due to the immediate environment of the transponder it cannot be ensured that the resonant circuit retains its desired nominal frequency exactly. If the article to which the transponder is attached is for example an aluminium case such as the type used in luggages the resonant frequency of the resonant circuit in the transponder is shifted to higher frequencies whilst at the same time the quality of the resonant circuit decreases. This detuning of the resonant circuit has two disadvantageous consequences. Firstly, the energy transmission from the interrogation device to the respond device by means of the HF interrogation pulse is impaired because the oscillating circuit in the responder device no longer operates in resonant mode. If the energy transmitted still suffices to initiate the sending back of the stoned data, then said sending back is done at a frequency which does not correspond to the desired frequency of the interrogation device. This can lead to the data no longer being uniquely interpreted in the interrogation device.

SUMMARY OF THE INVENTION

The invention is based on the problem of providing a method of the type set forth at the beginning which ensures a reliable data transmission between the responder device and tile interrogation device even under unfavourable use conditions of the interrogation device and with low demands on the accuracy and tolerances of the components decisive for the transmitting frequency of the responder.

This problem is solved according to the invention in that the frequency of the HF interrogation pulse is varied during the transmission thereof over a predetermined range which contains the nominal frequency of the responder and that the receiving section of the interrogation device includes a tuning circuit which adjusts the receiving frequency of the receiving section to the frequency of the HF signal transmitted by the responder .

In the method according to the invention the HF interrogation pulse is not transmitted with constant frequency but instead during the transmission a frequency range containing the nominal frequency of the responder is traversed. As a result , the responder device can receive the HF interrogation pulse even if its resonant circuit defining the nominal frequency has gone off resonance. The tuning circuit contained in the receiving section of the interrogation device leads to the HF signals transmitted by the responder device being received in optimum manner even when the responder device, due to the detuning of its resonant circuit, does not operate with the nominal frequency. The tuning of the receiving section of the interrogation device to the particular frequency of the HF signal transmitted by the responder device leads to an improvement of the signal-to-noise ratio because even when the resonant circuit of the responder device is out of tune a high useful signal level is maintained in the interrogation device.

An advantageous further development of the method according to the invention resides in that for the tuning circuit a frequency control circuit is used which causes the receiving frequency of the receiving section to track the frequency of the HF signal transmitted by the responder.

Another advantageous further development resides in that the tuning circuit is configured in such a manner that it determines the deviation of the frequency of the HF signal transmitted by the responder from a nominal value and in dependence upon the deviation switches the receiving frequency of the receiving section to the received frequency. In this embodiment of the method according to the invention a particularly rapid adjustment of the receiving section of tile interrogation device to the particular frequency transmitted by the responder can be achieved.

An advantageous further development of the method according to the invention resides in that the change of the frequency of the HF interrogation pulse is carried out slower at tile lower end of the range than at the upper end of the range. This further development takes account of the fact that when tile resonant circuit of the responder device becomes detuned towards higher frequencies the quality of the resonant circuit is also reduced. By changing the rate of tile frequency change it is possible to achieve that with a circuit of high quality and correspondingly narrow resonant curve as well as with a circuit of low quality and correspondingly wide resonant curve almost tile same energy is transmitted by the interrogation device to the responder device.

BRIEF DESCRIPTION OF THE DRAWINGS

The invention will now be explained by way of example with the aid of the drawing, the single Figure of which shows in schematic form an arrangement which comprises an interrogation device and a responder device and in which tile method according to the invention can be employed.

DETAILED DESCRIPTION OF THE INVENTION

The arrangement illustrated in the drawing includes an interrogation device 10 having a transmitting section 12, a receiving section 14 and an evaluating section 16. The receiving section comprises on the input side a tuning circuit 15 which makes it possible to adjust the receiving frequency of the receiving section 14 in dependence upon the frequency of the HF signal supplied thereto by an antenna 18. Said antenna 18 is coupled both to the transmitting section 12 and to the receiving section 14. Furthermore, the arrangement includes a responder device 20 having a transmitting section 22, a receiving section 24 and a data memory 26. The receiving section 24 and the transmitting section 22 of the responder device 20 are coupled to an antenna 28.

The responder 20 can be attached to an object to which an identification number is allocated and said identification number is stored in the data memory 26. The contents of tile data memory 26 can be transmitted to the interrogation device 10 and evaluated by the evaluating section 16 thereof. In this manner it is possible to identify the object to which the responder device 10 is attached.

In detail, the following steps take place in an identification operation:

The interrogation device 10, which may be an appliance held in the hand by an operator, after actuation of a key switch, not shown, by the operator, transmits an HE interrogation pulse generated in the transmitting section 12 by means of the antenna 18. For a purpose still to be explained, the frequency of said HF interrogation pulse passes through a frequency range starting with a lower frequency f1 up to an upper frequency f2. In a practical use, the lower frequency f1 is 120 KHz and the upper frequency f2 is 150 KHz. The transmitted HF interrogation pulse is received by the antenna 28 of the responder device 20. Said antenna 28 consists of a coil forming together with a capacitor a resonant circuit which is tuned to a predetermined nominal frequency of lying in the range between f1 and f2. The HE interrogation pulse received by the antenna 28 is rectified in the receiving section 24 and used to charge a capacitor which serves as energy accumulator and from which, after completion of the HF interrogation pulse, the supply energy for the responder device 20 is taken. If the voltage present at said energy storage capacitor has a sufficiently high value after termination of tile HF interrogation pulse, in the responder device 20 transmission of an HF signal by the transmitting section 22 via the antenna 28 is initiated, said signal being coded with the contents of the data memory 26. This coding may for example be achieved by modulation of the HF signal. The HE signal irradiated by the antenna 28 is received by the antenna 18 of the interrogation device 10 and supplied by the receiving section 14 thereof to the evaluating section 16 in which the HF signal is decoded.

It is possible in this manner with the aid of the interrogation device 10 to read the content of the data memory 26 so that an object to which the responder device 20 is attached can be uniquely identified by the decoded information.

The specific construction of the interrogation device 10 and the responder device 20 are of only secondary importance to the method described here and can be seen from EP-A-0 301 127.

The HF interrogation pulse transmitted by the antenna 18 does not have a fixed frequency but as explained above S5 passes through a frequency range from f1 to f2. Transmission with a single frequency permits transmission of adequate energy from the interrogation device 10 to the responder device 20 only when the antenna 28 is exactly tuned to said frequency, i.e. the reception can take place in resonance mode. This is however not ensured with certainty because the resonant frequency of the resonant circuit to which the antenna 28 can change with the course of time or due to external influences. A serious external influence arises when the responder device 20 is attached to an article of metal, for example to an aluminium case. The aluminium case could be, for example, a piece of luggage or a luggage frame. The proximity of the aluminium to the antenna 28 effects a detuning in the sense of increasing the frequency and this simultaneously entails a decrease in the quality of the associated resonant circuit. If the HF interrogation pulse were transmitted by the antenna 18 with only one frequency, such an off-resonance would certainly lead to the energy received by the antenna 28 no longer sufficing to furnish the necessary supply energy for sending back tile content of the data memory 26. Since however the HF interrogation pulse passes through a frequency range containing the nominal frequency of to which the resonant circuit associated with the antenna 28 is tuned, it is certain that in the course of the frequency variation the resonant frequency of the resonant circuit is also traversed so that adequate energy transmission can take place.

To ensure adequate energy transmission it is however advantageous for the frequency of the HF interrogation pulse not to traverse the range from f1 to f2 at a constant rate. Since in practice the detuning of the antenna 28 almost always takes place in the direction towards higher frequencies at which a poorer quality is then present, resulting in a broadening of the resonant curve of the resonant circuit, the frequency change of the HF interrogation pulse is carried out so that the rate of change is lower in the vicinity of the frequency f1 than in the region of the frequency f2. This means that the frequency change starts slowly at the frequency f1 and becomes progressively faster up to the frequency f2. With such a variation of tile frequency change of the HF interrogation signal responder devices 20 may be interrogated in which tile resonant circuit is not out of tune, i.e. has tile nominal value fo of the resonant frequency, and also responder devices 20 of which the resonant frequency has been detuned towards higher frequencies by proximation of the resonance circuit to a metal. Since at the lower resonant frequencies a higher quality of the resonant circuit and thus a narrower resonance curve is present, the frequency of the HF interrogation pulse must not pass through the range of the lower frequencies at too high a velocity since otherwise during the passage it will not be possible for adequate energy to be transmitted to the responder device 20. In responder devices 20 with off-tune resonant circuits however, the quality of the resonant circuit is smaller so that a wider resonance curve is present and this in turn leads to enough energy being transmitted even on faster passage through the frequency of the HF interrogation pulse.

The off-resonance of tile resonance circuit belonging to the antenna 28 results in the frequency of the HF signal transmitted by the antenna 28 not corresponding to the nominal frequency fo expected by the receiving section 14 of the interrogation device 10. To nevertheless ensure satisfactory reception, tile receiving section 14 is equipped with the tuning circuit 15 which causes the receiving frequency to track the frequency of the HF signal transmitted by the responder device. This tuning circuit 15 may be formed by a frequency control loop as is generally known under the designation AFC. Due to this track control the reception by the receiving section 14 is always optimum and consequently a high signal-to-noise ratio results which in turn permits excellent evaluation of the received signal in the evaluating section 16.

Since when the method described is used it is no longer necessary for the responder device 20 to transmit with an exactly tuned frequency, the costs of manufacturing said responder device 20 may be reduced because exact calibration of its resonant circuit governing the transmitting and receiving frequency can be dispensed with.

Instead of using a frequency control loop for tracking the receiving frequency of the interrogation device, the tuning circuit 15 can be configured so that in dependence upon the frequency of the HF signal transmitted by the responder device 20 it switches the receiving frequency of the interrogation device 10 directly to said frequency. For this purpose the tuning circuit can detect, for example by means of a known S curve demodulator, the deviation of the frequency of the HF signal transmitted by the responder device 20 from a given nominal frequency and with the aid of a signal proportional to the deviation variable capacitance diodes lying in the receiving circuit of the receiving section 14 can be connected into the resonant circuit or disconnected therefrom in such a manner that the resonant circuit is tuned to the particular frequency received . This type of tuning of tile receiving section 14 can be carried out very rapidly so that even after brief transmission of tile HF signal by tile responder device 20 exact tuning of tile receiving section 14 to the transmitted frequency can take place. When using this embodiment of the tuning circuit 15 as well excellent information transmission can take place between the responder device 20 and the interrogation device 10 without the frequency-governing component in the responder device 20 having to be exactly adjusted or equipped with narrow tolerances.

I claim:

1. A method of reading data stored in a passive responder, having a nominal operating frequency within a selected frequency range, by an interrogation device having a receiving section for receiving signals having a frequency within said selected frequency range, comprising the steps of:

transmitting an interrogation pulse from said interrogation device, the frequency of said interrogation pulse varying over said selected frequency range;

receiving said interrogation pulse transmitted from said interrogation device by said passive responder, said passive responder generating a supply voltage from said interrogation pulse and initiating a response signal at said nominal frequency and coded with said stored data; and receiving said response signal transmitted from said passive responder by said interrogation device and tuning the receiving section of said interrogation device to said nominal frequency transmitted by said passive responder.

2. A method according to claim 1, wherein said tuning step further comprises the steps of:

tracking the frequency of the signal transmitted by the responder with a frequency control circuit.

3. A method according to claim 1, wherein said tuning step further comprises the steps of:

determining a deviation of said frequency of the response signal transmitted by the responder from a preselected value; and switching the receiving frequency of the receiving section to the nominal frequency of said response signal.

* * * * *